(12) United States Patent
Yonezaki et al.

(10) Patent No.: US 8,615,430 B2
(45) Date of Patent: Dec. 24, 2013

(54) METHODS AND APPARATUS FOR OPTIMIZING ADVERTISEMENT ALLOCATION

(75) Inventors: Tadashi Yonezaki, Newton, MA (US); Steven Lee, Arlington, MA (US)

(73) Assignee: Tremor Video, Inc., New York, NY (US)

( * ) Notice: Subject to any disclaimer, the term of this patent is extended or adjusted under 35 U.S.C. 154(b) by 246 days.

(21) Appl. No.: 12/950,160

(22) Filed: Nov. 19, 2010

(65) Prior Publication Data

US 2011/0125573 A1    May 26, 2011

Related U.S. Application Data

(60) Provisional application No. 61/281,613, filed on Nov. 20, 2009, provisional application No. 61/384,465, filed on Sep. 20, 2010.

(51) Int. Cl.
*G06Q 30/00* (2012.01)
(52) U.S. Cl.
USPC ..................................................... 705/14.48
(58) Field of Classification Search
USPC ..................................................... 705/14.48
See application file for complete search history.

(56) References Cited

U.S. PATENT DOCUMENTS

| | | | |
|---|---|---|---|
| 5,617,486 | A | 4/1997 | Chow et al. |
| 5,778,340 | A | 7/1998 | Hattori |
| 5,864,810 | A | 1/1999 | Digalakis et al. |
| 5,951,642 | A | 9/1999 | Onoe et al. |
| 6,208,720 | B1 | 3/2001 | Curtis et al. |
| 6,223,159 | B1 | 4/2001 | Ishii |
| 6,285,999 | B1 | 9/2001 | Page |
| 6,343,267 | B1 | 1/2002 | Kuhn et al. |
| 6,389,377 | B1 | 5/2002 | Pineda et al. |
| 6,505,169 | B1 | 1/2003 | Bhagavath et al. |
| 6,560,578 | B2 | 5/2003 | Eldering et al. |
| 6,704,930 | B1 | 3/2004 | Eldering et al. |
| 6,879,956 | B1 | 4/2005 | Honda et al. |

(Continued)

FOREIGN PATENT DOCUMENTS

WO     WO 2006/076661        7/2006

OTHER PUBLICATIONS

Office Action for U.S. Appl. No. 12/047,169, mailed Oct. 22, 2010.
Office Action for U.S. Appl. No. 12/047,169, mailed Apr. 21, 2011.
International Search Report and written Opinion for International Application No. PCT/US2008/056799, mailed Jun. 24, 2008.
Supplementary European Search Report for European Application No. EP06837147.5, mailed Jul. 7, 2010.

(Continued)

*Primary Examiner* — John G Weiss
*Assistant Examiner* — Adam Chornesky
(74) *Attorney, Agent, or Firm* — Cooley LLP

(57) ABSTRACT

In some embodiments, an apparatus includes a weight module, a performance module and an allocator module. The weight module calculates a weight for each segment from a set of segments of potential advertisement placements matching a criterion. The weight for a segment is based at least partially on (1) a budget score for an advertisement campaign and (2) a number of potential placements for the segment. The performance module calculates a performance score for the advertisement campaign at each segment from the set of segments. The performance score of the segment is based on a success metric for an advertisement at the segment and a number of impressions for the segment. The allocator module presents the advertisement at a placement associated with the segment if the weight for the segment is greater than a first threshold and the performance score for the segment is greater than a second threshold.

20 Claims, 5 Drawing Sheets

(56) References Cited

U.S. PATENT DOCUMENTS

| | | |
|---|---|---|
| 6,907,566 B1 | 6/2005 | McElfresh et al. |
| 6,944,585 B1 | 9/2005 | Pawson |
| 6,952,419 B1 | 10/2005 | Cassiday et al. |
| 7,065,488 B2 | 6/2006 | Yajima et al. |
| 7,136,875 B2 | 11/2006 | Anderson et al. |
| 7,356,590 B2 | 4/2008 | Wilson et al. |
| 7,822,636 B1 | 10/2010 | Ferber et al. |
| 8,301,497 B2 * | 10/2012 | Amini et al. ................ 705/14.4 |
| 2002/0049635 A1 | 4/2002 | Mai et al. |
| 2002/0059604 A1 | 5/2002 | Papagan et al. |
| 2002/0068525 A1 | 6/2002 | Brown et al. |
| 2002/0082941 A1 | 6/2002 | Bird |
| 2002/0087980 A1 | 7/2002 | Eldering et al. |
| 2002/0144261 A1 | 10/2002 | Schwalb et al. |
| 2002/0174425 A1 | 11/2002 | Markel et al. |
| 2003/0050863 A1 | 3/2003 | Radwin |
| 2003/0055729 A1 | 3/2003 | Bezos et al. |
| 2003/0061566 A1 | 3/2003 | Rubstein et al. |
| 2003/0070167 A1 | 4/2003 | Holtz et al. |
| 2003/0079226 A1 | 4/2003 | Barrett |
| 2003/0101230 A1 | 5/2003 | Benschoter et al. |
| 2003/0121046 A1 | 6/2003 | Roy et al. |
| 2003/0174837 A1 | 9/2003 | Candelore et al. |
| 2003/0206720 A1 | 11/2003 | Abecassis |
| 2003/0220791 A1 | 11/2003 | Toyama |
| 2004/0003397 A1 | 1/2004 | Boston et al. |
| 2004/0051812 A1 | 3/2004 | Hayward |
| 2004/0059708 A1 | 3/2004 | Dean |
| 2004/0059712 A1 | 3/2004 | Dean et al. |
| 2004/0093327 A1 | 5/2004 | Anderson et al. |
| 2004/0172267 A1 | 9/2004 | Patel et al. |
| 2005/0021403 A1 | 1/2005 | Ozer et al. |
| 2005/0076357 A1 | 4/2005 | Fenne |
| 2005/0102375 A1 | 5/2005 | Varghese |
| 2005/0114198 A1 | 5/2005 | Koningstein et al. |
| 2005/0137958 A1 | 6/2005 | Huber et al. |
| 2005/0149396 A1 | 7/2005 | Horowitz et al. |
| 2005/0182626 A1 | 8/2005 | Kim et al. |
| 2005/0190973 A1 | 9/2005 | Kristensson et al. |
| 2005/0192802 A1 | 9/2005 | Robinson et al. |
| 2005/0246348 A1 | 11/2005 | Hijikata et al. |
| 2006/0026628 A1 | 2/2006 | Wan et al. |
| 2006/0058999 A1 | 3/2006 | Barker et al. |
| 2006/0063587 A1 | 3/2006 | Manzo |
| 2006/0074753 A1 | 4/2006 | Schuh et al. |
| 2006/0116924 A1 | 6/2006 | Angles et al. |
| 2006/0135232 A1 | 6/2006 | Willis |
| 2006/0156326 A1 | 7/2006 | Goronzy et al. |
| 2006/0161553 A1 | 7/2006 | Woo |
| 2006/0167749 A1 | 7/2006 | Pitkow et al. |
| 2006/0212350 A1 | 9/2006 | Ellis et al. |
| 2006/0212897 A1 | 9/2006 | Li et al. |
| 2006/0224444 A1 | 10/2006 | Koningstein et al. |
| 2006/0224448 A1 | 10/2006 | Herf |
| 2006/0242016 A1 | 10/2006 | Chenard |
| 2007/0055986 A1 | 3/2007 | Gilley et al. |
| 2007/0067215 A1 | 3/2007 | Agarwal et al. |
| 2007/0078707 A1 | 4/2007 | Axe et al. |
| 2007/0094363 A1 | 4/2007 | Yruski et al. |
| 2007/0101387 A1 | 5/2007 | Hua et al. |
| 2007/0112567 A1 | 5/2007 | Lau et al. |
| 2007/0112630 A1 | 5/2007 | Lau et al. |
| 2007/0184820 A1 | 8/2007 | Marshall |
| 2007/0219984 A1 | 9/2007 | Aravamudan et al. |
| 2008/0010339 A1 | 1/2008 | Shin et al. |
| 2008/0010654 A1 | 1/2008 | Barrett et al. |
| 2008/0045336 A1 | 2/2008 | Stelzer et al. |
| 2008/0046562 A1 | 2/2008 | Butler |
| 2008/0059312 A1 | 3/2008 | Gern et al. |
| 2008/0066107 A1 | 3/2008 | Moonka et al. |
| 2008/0098301 A1 | 4/2008 | Black et al. |
| 2008/0109300 A1 | 5/2008 | Bason |
| 2008/0109391 A1 | 5/2008 | Chan |
| 2008/0133475 A1 | 6/2008 | Fischer |
| 2008/0178234 A1 | 7/2008 | Eyal et al. |
| 2008/0183555 A1 | 7/2008 | Walk |
| 2008/0228576 A1 | 9/2008 | Yonezaki |
| 2008/0228581 A1 | 9/2008 | Yonezaki et al. |
| 2008/0288973 A1 | 11/2008 | Carson et al. |
| 2008/0307454 A1 | 12/2008 | Ahanger et al. |
| 2008/0320531 A1 | 12/2008 | Kim et al. |
| 2009/0007172 A1 | 1/2009 | Ahanger et al. |
| 2009/0013347 A1 | 1/2009 | Ahanger et al. |
| 2009/0019488 A1 | 1/2009 | Ruiz-Velasco et al. |
| 2009/0077033 A1 | 3/2009 | McGary et al. |
| 2009/0083417 A1 | 3/2009 | Hughes et al. |
| 2009/0119169 A1 | 5/2009 | Chandratillake et al. |
| 2009/0171728 A1 | 7/2009 | Yan et al. |
| 2009/0259551 A1 | 10/2009 | Chenard et al. |
| 2009/0259552 A1 | 10/2009 | Chenard et al. |
| 2010/0011020 A1 | 1/2010 | Bouzid et al. |
| 2010/0023960 A1 | 1/2010 | Hasson |
| 2010/0049613 A1 | 2/2010 | Angles et al. |
| 2010/0057576 A1 | 3/2010 | Brodersen et al. |
| 2010/0114696 A1 * | 5/2010 | Yang ........................ 705/14.49 |
| 2010/0121776 A1 * | 5/2010 | Stenger ....................... 705/347 |
| 2010/0191680 A1 | 7/2010 | Lee et al. |
| 2011/0078018 A1 * | 3/2011 | Chunilal .................. 705/14.48 |
| 2011/0093783 A1 | 4/2011 | Parra |
| 2011/0125573 A1 | 5/2011 | Yonezaki et al. |
| 2011/0295716 A1 * | 12/2011 | Dumon et al. ............ 705/26.61 |
| 2012/0203598 A1 * | 8/2012 | Patterson ..................... 705/7.42 |

OTHER PUBLICATIONS

Office Action for U.S. Appl. No. 11/594,707, mailed Mar. 18, 2010.
Final Office Action for U.S. Appl. No. 11/594,707, mailed Jul. 15, 2009.
Office Action for U.S. Appl. No. 11/594,707, mailed Jul. 23, 2008.
Office Action for U.S. Appl. No. 11/594,707, mailed Sep. 9, 2010.
Office Action for U.S. Appl. No. 11/594,707, mailed Aug. 31, 2011.
International Search Report and Written Opinion for International Application No. PCT/US2006/043475, mailed Jul. 3, 2008.
Office Action for U.S. Appl. No. 11/594,714, mailed Aug. 18, 2010.
Office Action for U.S. Appl. No. 11/594,714, mailed Feb. 23, 2010.
Office Action for U.S. Appl. No. 11/594,714, mailed Apr. 4, 2011.
Office Action for U.S. Appl. No. 11/594,714, mailed Oct. 20, 2011.
International Search Report and Written Opinion for International Application No. PCT/US2007/083806, mailed May 16, 2008.
Office Action for U.S. Appl. No. 11/594,717, mailed Sep. 25, 2008.
International Search Report and Written Opinion for International Application No. PCT/US2006/043292, mailed Oct. 19, 2007.
Office Action for U.S. Appl. No. 11/943,357, mailed Nov. 10, 2010.
International Search Report and Written Opinion for International Application No. PCT/US2007/086821, mailed Apr. 23, 2008.
International Search Report and Written Opinion for International Application No. PCT/US2010/057408, mailed Apr. 16, 2012.
Chorianopoulos et al., "Affective Usability Evaluation for an Interactive Music Television Channel," ACM Computers in Entertainment, vol. 2, No. 3, Jul. 2004, Article 7B Retrieved from the Internet Apr. 24, 2008, <URL:http://www.dmst.aueb.gr/dds/pubs/jrnl/2004-CIE-VC/html/CS04b.pdf>.
Google definitions of "Rich Media" generated Mar. 2, 2010.
Hanjalic, A. et al, "Affective video content representation and modeling," IEEE Transactions on Multimedia, 7(1):143-154 (2005).
Mishne, G. "Experiments with mood classification in blog posts," Informatics Institute, University of Amsterdam (2005).
Mishne, G. et al., "Language model mixtures for contextual ad placement in personal blogs," LNAI, 4139:435-446 (2006).
Mihalcea, R. et al., "A corpus-based approach to finding happiness," AAAI Spring Symposium, pp. 1-6 (2006).
Mihalcea, R. et al., "Learning to laugh (automatically): computational models for humor recognition," Computational Intelligence, 22(2):126-142 (2006).
Young et al., "The HTK book," Microsoft (2000).

* cited by examiner

300

|  | Criterion | Number of Potential Placements |
|---|---|---|
| Campaign | Age:25-45 | 100 |
| Segment 1 | Male; income > $100k | 20 |
| Segment 2 | Female; Location: NYC | 10 |
| Segment 3 | Male; income <= $100k | 40 |
| Segment 4 | Female; Location: Not NYC | 30 |

|  | Success Metric | Number of Impressions |
|---|---|---|
| Segment 1 | 50 | 100 |
| Segment 2 | 20 | 110 |
| Segment 3 | 0 | 2 |
| Segment 4 | 14 | 50 |

FIG. 4

METHODS AND APPARATUS FOR OPTIMIZING ADVERTISEMENT ALLOCATION

CROSS-REFERENCE TO RELATED APPLICATIONS

This application claims priority to and the benefit of U.S. Provisional Patent Application Ser. No. 61/281,613, filed Nov. 20, 2009, and entitled "Ad Optimizer with Prediction Table," and U.S. Provisional Patent Application Ser. No. 61/384,465, filed Sep. 20, 2010, and entitled "Optimized Ad Allocation," each of which is incorporated herein by reference in its entirety.

BACKGROUND

Embodiments described herein relate generally to advertisement placement and more particularly to methods and apparatus for optimizing advertisement allocation.

Some known advertisement allocators place advertisements at placements (e.g., websites, video streams, audio streams, etc.) based on a performance of the advertisement. For example, if the advertisement has previously performed well, the advertisement allocator will place the advertisement. Similarly, if the advertisement has not previously performed well, the advertisement allocator will not place the advertisement. Such known advertisement allocators do not, however, account for a campaign budget. As such, because of past performance of the advertisements in a campaign, the advertisement allocator may not place enough advertisements from the campaign to fill and/or use the budget allotted to the advertisement campaign because of past performance.

Accordingly, a need exists for methods and apparatus to allocate advertisements from an advertisement campaign based on performance and the budget allotted to the advertisement campaign.

SUMMARY

In some embodiments, an apparatus includes a weight module, a performance module and an allocator module. The weight module calculates a weight for each segment from a set of segments of potential advertisement placements matching a criterion. The weight for a segment is based at least partially on (1) a budget score for an advertisement campaign and (2) a number of potential placements for the segment. The performnance module calculates a performance score for the advertisement campaign at each segment from the set of segments. The performance score of the segment is based on a success metric for an advertisement at the segment and a number of impressions for the segment. The allocator module presents the advertisement at a placement associated with the segment if the weight for the segment is greater than a first threshold and the performance score for the segment is greater than a second threshold.

BRIEF DESCRIPTION OF THE DRAWINGS

FIG. 3 is a table illustrating an example of a campaign and the segments associated with that campaign, according to another embodiment.

FIG. 4 is a table illustrating an example of the entries of a performance database for an advertisement campaign, according to another embodiment.

DETAILED DESCRIPTION

Figure 1:
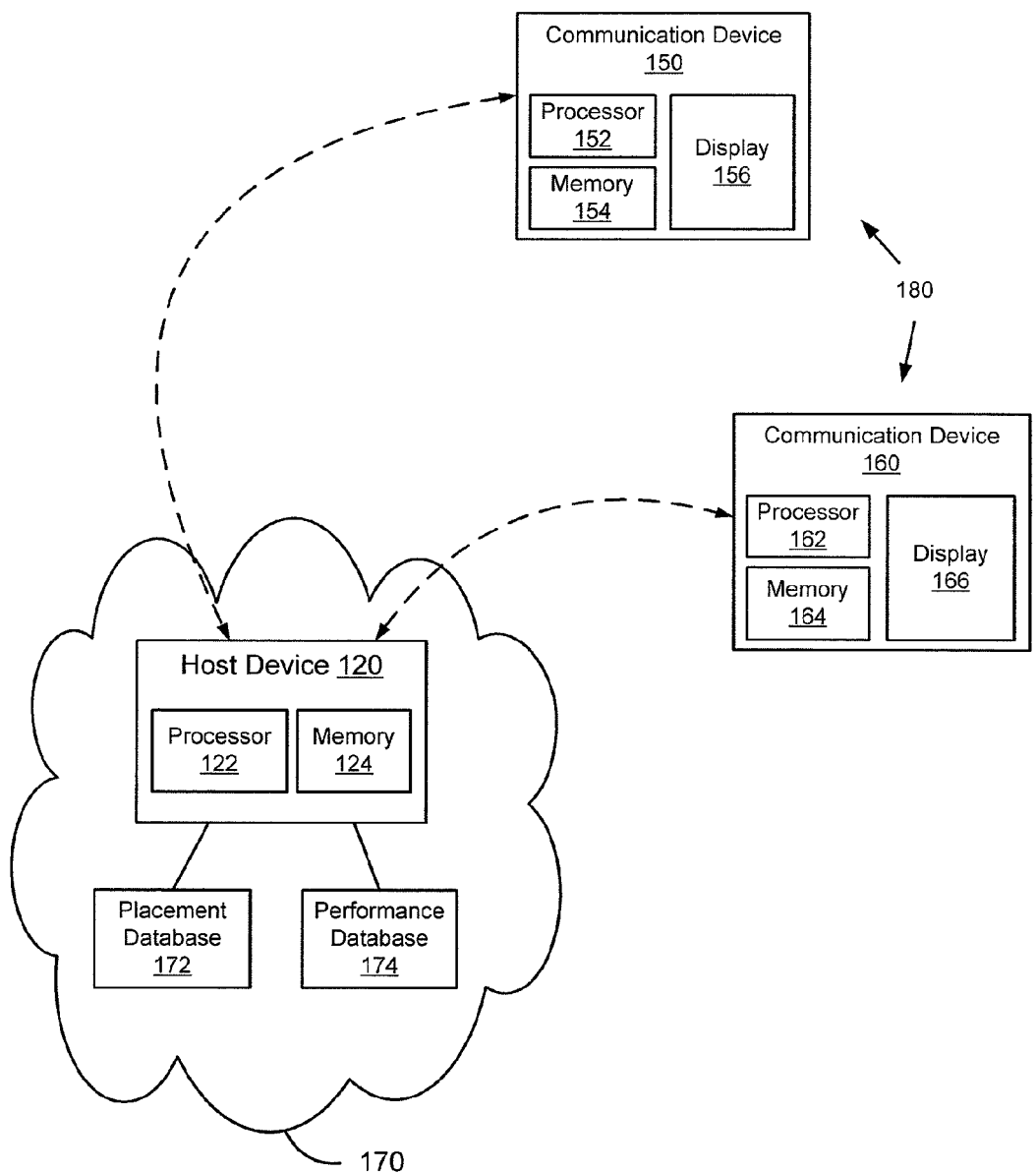
FIG. 1 is a schematic diagram that illustrates communication devices in communication with a host device via a network, according to an embodiment.

In some embodiments, an apparatus includes a weight module, a performance module and an allocator module. The weight module is configured to calculate a weight for each segment from a set of segments of potential advertisement placements matching a criterion. The weight for a segment from the set of segments is based at least partially on (1) a budget score for an advertisement campaign with at least one advertisement and (2) a number of potential placements for the segment from the set of segments. The performance module is configured to calculate a performance score for the advertisement campaign at each segment from the set of segments. The performance score of the segment from the set of segments is based on a success metric for the at least one advertisement at the segment from the set of segments and a number of impressions for the segment from the set of segments. The allocator module is configured to present the at least one advertisement at a placement associated with the segment if the weight for the segment is greater than a first threshold and the performance score for the segment is greater than a second threshold.

In such embodiments, the apparatus can ensure that the budget of an advertising campaign is spent by using a budget score when calculating the weight of a segment. Additionally, the apparatus can ensure that advertisements are not placed at segments having low performance unless too few segments having a high performance are available for placement such that the campaign budget is spent. Accordingly, the apparatus places advertisements at lower performing segments when the budget would not be spent by placing advertisements solely at higher performing segments.

A non-transitory processor-readable medium stores code that represents instructions to cause a processor to calculate a budget score for an advertisement campaign. The budget score is based on a number of advertisement units in a campaign budget of the advertisement campaign and a number of potential placements matching a criterion of the advertisement campaign. The non-transitory processor-readable medium stores code that represents instructions to cause the processor to calculate a weight for each segment from a set of segments of the potential placements matching the criterion. The weight for a segment from the set of segments is based on the budget score and a relationship between a number of potential placements for that segment from the set of segments and a number of potential placements for the remaining segments from the set of segments. The non-transitory processor-readable medium further stores code that represents instructions to cause the processor to present at least one advertisement from the advertisement campaign to a placement associated with the segment from the set of segments if the weight for that segment is greater than a threshold.

A non-transitory processor-readable medium stores code that represents instructions to cause a processor to calculate a weight for each segment from a set of segments of potential advertisement placements matching a criterion. The weight for a segment from the set of segments is based at least partially on a campaign budget of an advertisement campaign and a number of potential placements for the segment from the set of segments. The non-transitory processor-readable medium stores code that represents instructions to cause the processor to calculate a predicted performance value for the segment from the set of segments based on a relationship of a success metric for the segment from the set of segments and a number of impressions for the segment from the set of segments. The non-transitory processor-readable medium further stores code that represents instructions to cause the processor to determine whether to present an advertisement from the advertisement campaign at a placement associated with the segment from the set of segments based on the weight for the segment and the predicted performance value for the segment.

As used herein, "criterion" can include a criterion defined by a single property, parameter and/or requirement and a criterion defined by multiple properties, parameters and/or requirements. For example, a first criterion can include "all males" and a second criterion can include "all females between the ages of 55-65 living in New York City."

As used in this specification, the singular forms "a," "an" and "the" include plural referents unless the context clearly dictates otherwise. Thus, for example, the term "module" is intended to mean a single module or a combination modules.

FIG. 1 is a schematic diagram that illustrates communication devices 180 in communication with a host device 120 via a network 170, according to an embodiment. Specifically, communication device 150 is configured to communicate with the host device 120. Similarly, communication device 160 is configured to communicate with the host device 120. The network 170 can be any type of network (e.g., a local area network (LAN), a wide area network (WAN), a virtual network, a telecommunications network) implemented as a wired network and/or wireless network. As described in further detail herein, in some embodiments, for example, the communication devices 180 are personal computers connected to the host device 120 via an internet service provider (ISP) and the Internet (e.g., network 170).

The host device 120 can be any type of device configured to send data over the network 170 to and/or receive data from one or more of the communication devices 180. In some embodiments, the host device 120 can be configured to function as, for example, a server device (e.g., a web server device), a network management device, an advertisement placement device and/or so forth.

The host device 120 includes a memory 124 and a processor 122. The memory 124 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 124 of the host device 120 includes data used to place advertisements at various locations (e.g., at various websites). In such embodiments, for example, the host device 120 is configured to place advertisements within video streams, within audio streams, as pop-up advertisements, as banner advertisements, as advertisements embedded in the text of a website and/or the like. In some embodiments, the memory 124 stores instructions to cause the processor to execute modules, processes and/or functions.

The processor 122 of the host device 120 can be any suitable processing device configured to perform advertisement optimization and place advertisements at optimal placements (e.g., websites, video streams, audio streams, etc.), as described in further detail herein. More specifically, as described in further detail herein, the processor 122 can be configured to execute modules, functions and/or processes to optimize the placement of advertisements. In some embodiments, the processor 122 can be a general purpose processor, a Field Programmable Gate Array (FPGA), an Application Specific Integrated Circuit (ASIC), a Digital Signal Processor (DSP), and/or the like.

The host device 120 is operatively coupled to a placement database 172 and a performance database 174. The placement database 172 and the performance database 174 can be any suitable databases such as, for example, relational databases, object databases, object-relational databases, hierarchical databases, network databases, entity-relationship databases, and/or the like. While shown in FIG. 1 as being separate from the host device 120, in other embodiments the placement database 172 and the performance database 174 can be part of the host device 120. For example, the placement database 172 and the performance database 174 can be stored in the memory 124. Additionally, while shown in FIG. 1 as being separate databases, in other embodiments the placement database 172 and the performance database 174 can be part of a single database. As described in further detail herein, the host device 120 can use the placement database 172 and the performance database 174 to optimize the placement of the advertisements while using a budget of an advertisement campaign.

The placement database 172 is configured to store and/or maintain data associated with possible advertisement placements. More specifically, the placement database 172 stores and/or maintains data associated with each web site, video stream and/or audio stream at which the host device 120 can place and/or embed an advertisement. In some embodiments, the placement database 172 can also store and/or maintain data associated with probable demographics of each placement. For example, if a placement is a cartoon video stream, the demographic associated with that placement might be children under thirteen. For another example, if the placement is a football website, the demographic associated with that placement might be males over twenty. In some embodiments, and as described in further detail herein, a placement can be part of and/or associated with multiple demographic categories. Additionally, as described in further detail herein, a placement can be associated with sub-categories and/or demographic segments. For example, a placement can be associated with both "individuals between the age of 25-45" and "dog owners in Washington, D.C. between the age of 30-40." In such an example, the segment "dog owners in Washington, D.C. between the age of 30-40" is a sub-category and/or demographic segment of the broader demographic category "individuals between the age of 25-45."

The performance database 174 is configured to store and/or maintain data associated with the performance of specific advertisements at specific placement categories and/or segments. Such performance can be calculated and/or determined using any suitable metric. In some embodiments, for example, the performance of an advertisement at a segment can be a clickthrough rate (CTR) of the advertisement at the segment, a conversion rate of the advertisement at the segment, an engagement rate of the advertisement at the segment, a reach of the advertisement at the segment, the brand-lift of the advertisement at the segment, and/or the like. As described in further detail herein, the performance data stored in the performance database 174 can be used to predict future performance of an advertisement at a placement associated with a segment.

Each of the communication devices 180 can be, for example, a computing entity (e.g., a personal computing device such as a desktop computer, a laptop computer, etc.), a mobile phone, a monitoring device, a personal digital assistant (PDA), and/or so forth. Although not shown, in some embodiments, each of the communication devices 180 can include one or more network interface devices (e.g., a network interface card) configured to connect the communication devices 180 to the network 170. In some embodiments, the communication devices 180 can be referred to as client devices.

As shown in FIG. 1, the communication device 160 has a processor 162, a memory 164, and a display 166. The memory 164 can be, for example, a random access memory (RAM), a memory buffer, a hard drive, and/or so forth. The display 166 can be any suitable display, such as, for example, a liquid crystal display (LCD), a cathode ray tube display (CRT) or the like. Similar to communication device 160, the communication device 150 has a processor 152, a memory 154, and a display 156.

In some embodiments, a web browser application can be stored in the memory 164 of the communication device 160. Using the web browser application, the communication device 160 can send data to and receive data from the host device 120. Similarly, the communication device 150 can include a web browser application. In such embodiments, the communication devices 180 act as thin clients. This allows minimal data to be stored on the communication devices 180. In other embodiments, the communication devices 180 can include an application specific to communicating with the host device 120.

In some embodiments, when a user of a communication device 180 accesses a website using the web browser application, the host device can determine which advertisement to present to the user. As described in further detail herein, such a determination can be based on the budget of an advertisement campaign, the predicted performance of an advertisement at one or more segments with which the website is associated, a target demographic and/or criterion specified by the advertisement campaign, a number of potential placements for the one or more segments, a number of potential placements for the target demographic and/or criterion specified by the advertisement campaign, and/or the like.

As discussed above, the communication devices 180 can send data to and receive data from the host device 120 associated with advertisements. In some embodiments, the data sent between the communication devices 180 and the host device 120 can be formatted using any suitable format. In some embodiments, for example, the data can be formatted using extensible markup language (XML), hypertext markup language (HTML) and/or the like.

In some embodiments, one or more portions of the host device 120 and/or one or more portions of the communication devices 180 can include a hardware-based module (e.g., a digital signal processor (DSP), a field programmable gate array (FPGA)) and/or a software-based module (e.g., a module of computer code to be executed at a processor, a set of processor-readable instructions that can be executed at a processor). In some embodiments, one or more of the functions associated with the host device 120 (e.g., the functions associated with the processor 122) can be included in one or more modules (see, e.g., FIG. 2). In some embodiments, one or more of the functions associated with the communication devices 180 (e.g., functions associated with processor 152 or processor 162) can be included in one or more modules. In some embodiments, one or more of the communication devices 180 can be configured to perform one or more functions associated with the host device 120, and vice versa.

In some embodiments, the host device 120 does not deliver and/or provide advertisements directly to the communication devices 180. In such embodiments, for example, the host device 120 provides the advertisements to a third party (e.g., the owner of a website including a potential advertisement placement). The third party can then deliver and/or provide the advertisement to the communication devices 180 with the other content of the website. In other embodiments, the host device 120 delivers and/or provides the advertisements directly to the communication devices 180. In such embodiments, the third party can provide a website and/or other content to the communication devices 180 such that the advertisement can be presented to the user with the content provided by the third party.

Figure 2:
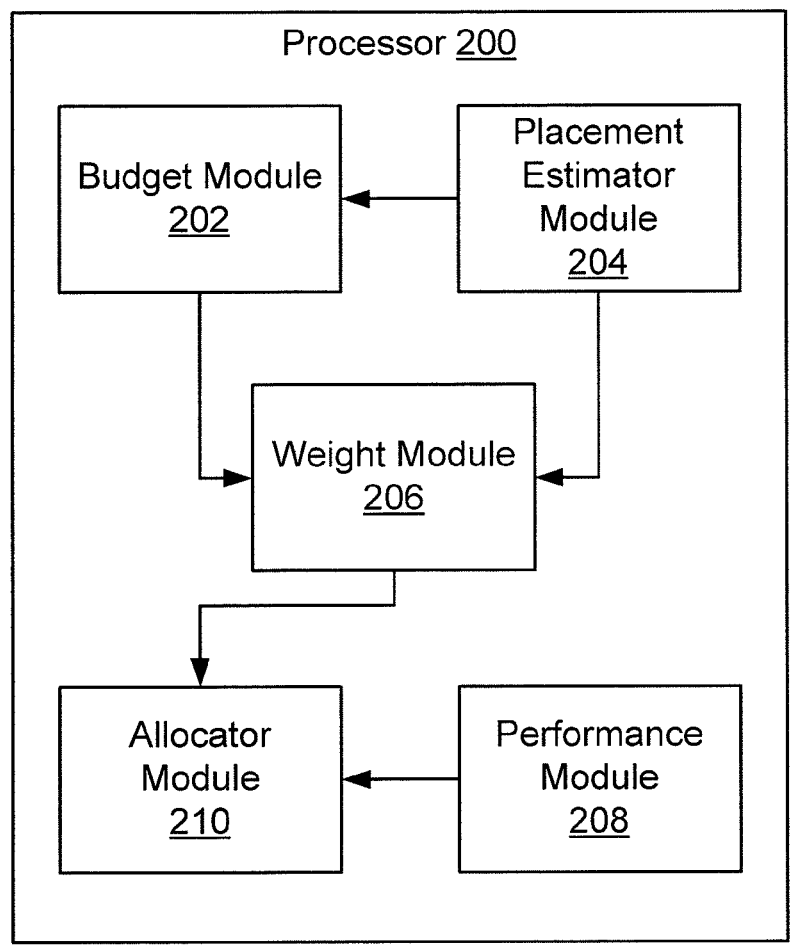
FIG. 2 is a schematic illustration of a processor of a host device, according to another embodiment.

FIG. 2 is a schematic illustration of a processor 200 of a host device, according to another embodiment. In some embodiments, the processor 200 can be similar to the processor 122 of the host device 120. More specifically, the processor 200 can be any suitable processing device configured to perform advertisement optimization and allocate advertisements to be placed at optimal placements.

The processor 200 includes a budget module 202, a placement estimator module 204, a weight module 206, a performance module 208, and an allocator module 210. While not shown in FIG. 2, in some embodiments, the processor 200 can include a communication module configured to communicate with communication devices (e.g., communication devices 180), third party host devices (e.g., website host devices), and/or other modules and/or devices.

The budget module 202 can be configured to calculate and/or determine a budget score for an advertisement campaign. In some embodiments, the budget score can be based on a number of advertisement units in a campaign budget of an advertisement campaign (e.g., $N_{Budget}$). In some embodiments, the advertisement units can be a number of impressions, a number of advertisement clicks, a conversion rate, a time spent, an engagement rate, a specified reach, a specified frequency, a specified brand-lift measurement, and/or the like, included within the campaign budget. For example, if an advertisement costs $1.00 per advertisement impression and a campaign budget is $1000, the advertisement campaign can include 1000 impressions.

In some embodiments, the budget score is also based on a number of potential placements (e.g., websites, video streams, audio streams, etc.) matching a criterion of the advertisement campaign (e.g., $N_{Campaign}$). In such embodiments, a provider of the advertisement campaign can specify a target demographic and/or criterion for the advertisement campaign. For example, a company might want to target individuals between the ages 25-45. For another example, a sports car company might want to initiate an advertisement campaign directed toward males between the ages of 35-55 during evening hours. Such a target can be supplied by the provider and/or purchaser of the advertisement campaign.

The placement estimator module 204 can be configured to estimate and/or determine a number of placements that are associated with and/or correspond to a supplied demographic and/or criterion. For example, the placement estimator module can receive the target demographic and/or criterion supplied by the provider and/or purchaser of the advertisement campaign and determine the number of potential placements that are associated with and/or correspond to that target demographic and/or criterion. Using the example provided above, the placement estimator module 204 can estimate and/or determine that there are 100 possible placements for the demographic/criterion: "individuals between the ages 25-45."

In some embodiments, the budget score for an advertisement campaign can be computed using formula (1):

$$\text{Budget Score} = \begin{cases} 1 & \text{if } N_{Campaign} \leq 0 \text{ or } N_{Budget} < 0 \\ \dfrac{N_{Budget}}{N_{Campaign}} & \text{otherwise} \end{cases} \quad (1)$$

As discussed above, $N_{Budget}$ can be a number of advertisement units in a campaign budget of an advertisement campaign and $N_{Campaign}$ can be a number of potential placements matching a criterion of the advertisement campaign. For example, if $N_{Budget}$=1000 (e.g., 1000 impressions in the budget) and $N_{Campaign}$=100 (e.g., 100 possible placements for the criterion), the budget score is equal to 10. Accordingly, the budget score is a relationship between a number of advertisement units in a campaign budget ($N_{Budget}$) and a number of potential placements matching a criterion of the advertisement campaign ($N_{campaign}$). For another example, if there are no possible placements for a given criterion (i.e., $N_{Campaign}$=0) or if the advertisement campaign is over budget (i.e., $N_{Budget}$<0), the budget score equals 1. In other embodiments, any other suitable relationship between the number of advertisement units in a campaign budget ($N_{Budget}$) and the number of potential placements matching a criterion of the advertisement campaign ($N_{campaign}$) can be used to calculate a budget score.

The weight module 206 can be configured to calculate a weight for the campaign at each segment of the advertisement campaign. FIG. 3, for example, is a table 300 illustrating the segments of an advertisement campaign. The criterion of the advertisement campaign provided by the purchaser and/or provider of the advertisement campaign is "individuals between the age 25-45." As illustrated in the table 300, the number of potential placements for the entire campaign is 100. These potential placements can be divided into multiple segments. In this example, the potential placements are divided into four unique segments. Segment 1, for example, includes placements (e.g., websites, video streams, audio streams, etc.) targeting "males having an income of greater than $100,000." As shown in FIG. 3, Segment 1 includes 20 possible placements. Similarly, Segment 2 includes placements targeting "females located in New York City" and includes 10 possible placements; Segment 3 includes placements targeting "males having an income of less than or equal to $100,000" and includes 40 possible placements; and Segment 4 includes placements targeting "females living outside New Your City" and includes 30 possible placements. Each segment of the advertisement campaign is a subset of the campaign criterion ("individuals between the age 25-45").

While FIG. 3 includes an example of a campaign including four segments, in other embodiments, a campaign can include any number of segments based on any suitable criterion, such as, for example, age, sex, geographic location, income level, indicated preferences, websites visited, internet protocol (IP) address, education level, school attended, website subscriptions, profession, interests, hobbies, time of the day, day of the week, month, season of year, and/or the like. Additionally, while shown in FIG. 3 as being mutually exclusive of each other, in other embodiments, a predicted placement can be included in more than one segment. As such, the criterion of one segment can overlap the criterion of another segment and/or a placement can be applicable to and/or associated with multiple segments.

Returning to FIG. 2, the weight module 206 can use the segment information and the budget score (calculated by the budget module 202) to calculate a weight for each segment. In some embodiments, the weight module 206 can use the following formulas (formulas (2) and (3)) to calculate the weight for each segment:

$$\text{Segment Weight} = \quad (2)$$

$$\begin{cases} 1 & \text{if } N_{Other} = 0 \text{ and Budget\_Score} \geq 1 \\ \text{Budget Score} \times \dfrac{N_{segment}}{N_{Other}} & \text{if } N_{Other} > 0 \\ \text{Budget Score} \times N_{segment} & \text{otherwise} \end{cases}$$

$$N_{Other} = N_{Campaign} - N_{Segment} \quad (3)$$

As discussed above, $N_{Campaign}$ can be a number of potential placements matching a criterion of an advertisement campaign and the budget score can be calculated by the budget module 202. $N_{segment}$ can be a number of potential placements matching a criterion of a segment of the advertisement campaign. For example, $N_{segment}$ for Segment 1 of the table 300 of FIG. 3 equals 20, $N_{Segment}$ for Segment 2 equals 10, $N_{Segment}$ for Segment 3 equals 40, and $N_{Segment}$ for Segment 4 equals 30.

Accordingly, if $N_{Other}$ equals zero and the budget score is greater than or equal to 1, the segment weight for that segment will be 1. According to formula (2), if $N_{other}$ equals 0, every potential placement in an advertisement campaign is included within a single segment (i.e., $N_{Campaign}=N_{segment}$). Thus, depending on the value of the budget score, the segment weight for a segment when $N_{Other}$ is 0 will equal 1 if the budget score is greater than or equal to 1 or the budget score multiplied by the number of placements in the segment ($N_{Segment}$) if the budget score is less than 1. In some embodiments, a budget score greater than one indicates that the number of advertising units in a campaign budget is greater than or equal to the number of possible placements for that budget.

Using the example of FIG. 3, a segment weight (i.e., a raw segment weight) can be calculated for each of the segments. For example, $N_{Other}$ of Segment 1 equals 80 (100 total placements for the campaign—20 total placements for Segment 1). $N_{other}$ is greater than 0 and, thus, the segment weight for the Segment 1 is based on the budget score for the campaign as well as a relationship between the number of placements for Segment 1 and the number of placements for the other segments of the campaign (i.e., Segment 2, Segment 3 and Segment 4). More specifically, using the budget score of 10 (e.g., 1000 possible impressions in the budget and 100 possible placements for the entire campaign) the segment weight for Segment 1 is equal to 2.5 (i.e., 10×20/80). Using a similar calculation, the segment weight (i.e., raw segment weight) for Segment 2 is equal to 1.11 (i.e., 10×10/90), the segment weight for Segment 3 is equal to 6.67 (i.e., 10×40/60), and the segment weight for Segment 4 is equal to 4.29 (i.e., 10×30/70).

In some embodiments, the raw weights for the segments can be normalized with respect to the sum of the raw weights for all the segments of a campaign. In such embodiments, for example, the normalized weight for Segment 1 can be calculated by dividing the raw weight of Segment 1 (2.5) by the sum of the raw segment weights for the segments of the campaign (i.e., 2.5+1.11+6.67+4.29=14.57). Accordingly, the normalized weight for Segment 1 equals 0.172. The normalized weight for Segment 2 (i.e., 1.11/14.57=0.076), the normalized weight for Segment 3 (i.e., 6.67/14.57=0.458), and the normalized weight for Segment 4 (i.e., 4.29/14.57=0.294) can be similarly calculated.

After the weights are normalized, the weight module 206 can provide to the allocator module 210 the normalized weight for each segment. In other embodiments, the raw weights are not normalized and the weight module 206 provides the raw weights to the allocator module 210.

The performance module 208 can be configured to calculate a performance score for each segment from the segments of the advertising campaign. The performance score of a segment can be used as an indication of a probable performance (i.e., predicted performance) of the advertisements of an advertisement campaign presented at the placements of that segment. The performance score of each segment can be calculated using the following formula (formula (4)):

$$\text{Performance Score} = \frac{\text{Success Metric} + 1}{\text{Number of Impressions} + 1} \quad (4)$$

The success metric for a segment can be a number of clicks, a number of items purchased based on the advertisement, and/or the like. The number of impressions for a segment is the number of advertisement impressions (e.g., views, audio playbacks, video playbacks, etc.) for an advertising campaign placed at the segment. Accordingly, the performance score is a modified ratio of the success metric and the number of impressions.

In formula (4), one is added to both the success metric and the number of impressions to ensure that a performance score for a segment is not initially zero. According to formula (4), the performance score for a segment is initially one (i.e., the maximum value for the performance score). As described in further detail herein with respect to the allocator module 210, this ensures that advertisements associated with an advertisement campaign are presented at a new advertisement segment. Similarly stated, a segment initially is provided a high performance score rather than a low performance score. As the number of impressions increases without the success metric increasing, the performance score begins to decrease. Thus, after the number of impressions becomes significantly large (i.e., the sample size increases), the performance score of an unsuccessful segment (i.e., as measured by the success metric) decreases. Similarly, as the success metric increases (e.g., the number of clicks for an advertisement at a segment increases), the performance score of that segment will remain high and/or will increase.

In some embodiments, the performance module 208 can retrieve the success metric and the number of impressions for a segment from a performance database (e.g., performance database 174 of FIG. 1). In such embodiments, the performance database can store a success metric and a number of impressions for each segment associated with an advertisement campaign. Continuing with the above referenced example, FIG. 4 is a table illustrating an example of the entries of a performance database for the advertisement campaign. Based on the values associated with each segment, the performance module 208 can calculate a performance score for each segment. For example, the performance score for Segment 1 is 0.505 (i.e., (50+1)/(100+1)), the performance score for Segment 2 is 0.189 (i.e., (20+1)/(110+1)), the performance score for Segment 3 is 0.333 (i.e., (0+1)/(2+1)), and the performance score for Segment 4 is 0.294 (i.e., (14+1)/(50+1)).

In some embodiments, the performance database can be updated each time the success metric and/or the number of impressions for a segment increases. Accordingly, the performance score for each segment can be current. In other embodiments, the performance database is updated periodically (e.g., every 10 seconds), after a predetermined number of impressions (e.g., after every 10 impressions for the campaign), and/or the like.

In some embodiments, after a period of time has elapsed, data (e.g., success metrics and/or number of impressions) can be removed from the performance database 174. For example, all data that was collected more than a time period (e.g., one week, one month, one year, etc.) before the current time can be removed from the performance database 174. This can ensure that the performance score for each segment is calculated based on current (and not outdated) data.

In some embodiments, the results of the calculations performed by the performance module 208 can be stored in a look-up table. In some embodiments, such a look-up table can be stored at a memory collocated with the processor 200 (e.g., memory 124 collocated with processor 122 in FIG. 1). In other embodiments, such a look-up table can be stored at a database such as the performance database 174. Such a look-up table can be used by the processor 200 to quickly retrieve a performance score for a segment (i.e., without having to calculate the performance score each time the campaign determines whether to place an advertisement at a segment).

In some embodiments, the look-up table can use a compression scheme and/or method to compress the size of the look-up table. This allows the look-up table (which can become relatively large) to be stored using less memory. In some embodiments, for example, a modified Run-Length-Encoding (RLE) scheme can be used to compress the look-up table. In such embodiments, an RLE compression scheme can be modified such that each coefficient of the RLE values is a cumulative coefficient rather than a discrete coefficient. For example, for a data value of "AAAABBAAAAAABBBA," RLE compression would result in "4A2B6A3B1A." In a modified RLE scheme, the same data value would result in "4A6B12A15B16A." Such a modified RLE scheme results in less computation as the coefficients are cumulative. Thus, for example, to determine the $13^{th}$ bit in the data value, a processor looks to which coefficients 13 is between. In this example, 13 is between the coefficients 12 and 15. Accordingly, the value of the $13^{th}$ bit is "B," the value following the higher coefficient (i.e., 15). In other embodiments, any other suitable compression scheme and/or method can be used to compress the look-up table.

After the performance module 208 calculates the performance score for each segment, the performance module 208 can send the performance scores to the allocator module 210. Using the performance scores for each segment and the normalized (or raw) weight for each segment, the allocator module 210 can determine whether or not to provide an advertisement associated with an advertisement campaign to a placement associated with a the segments.

In some embodiments, for example, the allocator module 210 can compare the weight of each segment with a weight threshold. If the weight of a segment is less than the weight threshold, for example, the allocator module 210 does not place an advertisement at that segment. If the weight of a segment is greater than the weight threshold, the allocator can further consider whether to place an advertisement at the segment. Because the allocator module uses the weight of a segment to at least partially determine whether or not to provide an advertisement to a placement of a segment, there is a greater probability that advertisements will be provided to the segments with the greater number of possible placements. This helps to ensure that the budget of the advertisement campaign is spent by providing advertisements to the segments with the greater number of possible placements. In some embodiments, the normalized weights are used to calculate the weight threshold and/or are compared to the weight threshold. In other embodiments, the raw weights are used to calculate the weight threshold and/or are compared to the weight threshold.

In some embodiments, the weight threshold can be predetermined. For example, if the normalized weight of a segment is less than 0.20, an advertisement is not placed at the segment. Continuing the example described above, in such an embodiment, the allocator module 210 does not place advertisements at Segment 1 (normalized weight=0.172) or Segment 2 (normalized weight=0.076) because their normalized weight is below the weight threshold (0.20).

In other embodiments, the weight threshold can be a random value between the lowest normalized weight and the highest normalized weight of the segments of an advertisement campaign. For the above described example, the weight threshold can be a random value between 0.076 (the noinialized weight for Segment 2) and 0.458 (the normalized weight for Segment 3). In still other embodiments, the weight threshold value can be an average of the raw weights. For example, the average raw weight for Segment 1, Segment 2, Segment 3 and Segment 4 is 3.64 (i.e., (2.5+1.11+6.67+4.29)/4). In such embodiments, the raw weights of the segments can be compared to the weight threshold.

If the weight of the segment is greater than the weight threshold, the allocator module 210 can compare the performance score of the segment to a performance threshold. If the performance score of the segment is greater than the threshold, the segment can be placed in a pool and/or group of segments at which advertisements from an advertisement campaign will be placed.

In some embodiments, the performance threshold can be predetermined. In such embodiments, an advertisement campaign provider can determine at what level of predicted performance (i.e., using the performance scores) to provide an advertisement to a segment. In other embodiments, the performance threshold can be determined based on the performance of the segments of the advertisement campaign. In some embodiments, for example, the performance threshold can be an average performance score of the segments from the advertisement campaign. In the above described example, the average performance score of the segments is 0.330 (i.e., (0.505+0.189+0.333+0.294)/4). Accordingly, in this example, the performance score of Segment 1 and the performance score of Segment 3 are above the performance threshold. In other embodiments, the performance threshold can be any other suitable value such as, for example, a ratio of the total success of the advertisement campaign and the total number of impressions for the advertisement campaign, a random value, a median performance score of the segments of the advertisement campaign, and/or the like.

The allocator module 210 can then place advertisements at the placements associated with the segments having both a weight greater than the weight threshold and a performance score greater than the performance threshold. The allocator module 210 can place the advertisements with the segments having the highest performance score first, and those having the lowest performance score last. Thus, if the campaign budget runs out prior to advertisements being placed at each segment having both a weight greater than the weight threshold and a performance score greater than the performance threshold, advertisements will not be placed at placements with the lowest performance score. Similarly stated, advertisements are placed at placements with the lowest performance score if a sufficient number of placements with higher performance scores are not available (e.g., advertisements have been placed at the placements with higher performance scores but budget sill remains).

After placement, the performance score for each segment can be continually updated. Similarly, the budget score for each campaign and the weights for each segment can be continually updated as more placements become available for a campaign and/or a segment and as the budget of a campaign increases and/or decreases. Accordingly, the host device can use the budget of the advertisement campaign in an effective manner by using segments having enough possible placements to ensure that the budget is spent but by placing the segments at the highest performing placements.

Because the weight of each segment is based partially on the budget score of the advertisement campaign, as the budget increases for an advertisement campaign and/or the number of possible placements for a campaign decreases, the deviation of the weights of the segments (i.e., difference between the highest segment weight and the lowest segment weight) increases. As described in further detail herein, this ensures that an advertisement campaign with a large budget but with few possible placements is spent on and/or focused at segments with the largest number of possible placements. Similarly, as the budget decreases for an advertisement campaign and/or the number of possible placements for a campaign increases, the deviation of the weights of the segments decreases. This increases the probability that the placement of advertisements at segments will be based more on predicted performance (i.e., performance scores) than on volume (i.e., which segment has the greatest number of possible placements).

While shown and described above as being based solely on a single campaign, in other embodiments, the weight for each segment associated with a campaign can be calculated with and/or depend at least in part on the weight for that segment associated with another campaign. For example, Segment 1 can be applicable to any number of campaigns. For example, Segment 1 can be applicable to a campaign with the criterion of "Age: over 50", to a campaign with the criterion of "Location: Boston", or any other campaign having a criterion of which "Male; income >$100 k" can be a subset. Accordingly, each of these campaigns will have advertisements that can be placed at placements associated with Segment 1. Making a weight for a segment associated with a campaign depend on the other campaigns with which that segment is associated ensures that the advertisements from optimal campaigns will be placed at the placements associated with that segment.

In some embodiments the following formulas (5) and (6) can be used (instead of the formulas (2) and (3) described above) to calculate the weight for each segment with respect to a campaign:

$$\text{Segment Weight}_{(CC)} = \begin{cases} \text{if } N_{Other(AC)} = 0 \text{ and Budget\_Score}_{(AC)} \geq 1 \\ \begin{cases} 0 & \text{if } N_{Other(CC)} > 0 \\ 1 & \text{otherwise} \end{cases} \\ \text{else} \end{cases}$$

$$\text{Segment Weight}_{(CC)} = \qquad (5)$$

$$\begin{cases} \text{Budget Score}_{(CC)} \times \dfrac{N_{segment}}{N_{Other(CC)}} & \text{if } N_{Other(CC)} > 0 \\ \text{Budget Score}_{(CC)} \times N_{segment} & \text{otherwise} \end{cases}$$

$$N_{Other(X)} = N_{Campaign(X)} - N_{Segment} \qquad (6)$$

For formulas (5) and (6):
AC=Any Campaign
CC=Current Campaign

As discussed above, $N_{Campaign}$ can be a number of potential placements matching a criterion of an advertisement campaign and the budget score for each campaign can be calculated by the budget module 202. $N_{Segment}$ can be a number of potential placements matching a criterion of a segment. For example, $N_{Segment}$ for Segment 1 of the table 300 of FIG. 3 equals 20, $N_{Segment}$ for Segment 2 equals 10, $N_{segment}$ for Segment 3 equals 40, and $N_{Segment}$ for Segment 4 equals 30.

Using formula (5), if $N_{Other(AC)}$ (i.e., $N_{other}$ for any campaign associated with a common segment) equals zero and the budget score for that campaign (Budget_Score$_{(Ac)}$) is greater than or equal to 1, the segment weight for that segment associated with a current campaign (i.e., Segment Weight$_{(CC)}$) will be 0 if $N_{Other(CC)}$ for the current campaign is greater than 0. Otherwise the segment weight for that segment associated with the current campaign (i.e., Segment Weight$_{(CC)}$) equals 1. Accordingly, the Segment Weight for a segment of a campaign, in which that segment is the only segment in that campaign (i.e., $N_{Campaign}=N_{Segment}$) and the budget score for that campaign is greater than or equal to 1 (as calculated above), will be equal to 1 while the segment weights for that segment of other campaigns (i.e., campaigns having more than the one segment) will be equal to 0. As described in further detail herein, this ensures that advertisements associated with that campaign (i.e., the campaign having $N_{Campaign}=N_{Segment}$) will be placed at the placements associated with that segment while advertisements associated with the other campaigns (i.e., campaigns having more than the one segment—$N_{Campaign}>N_{Segment}$) will not be placed at the placements associated with that segment. Similarly stated, because that segment is the only segment associated with that campaign, the advertisements associated with that campaign are given priority over advertisements associated with other campaigns, to be placed at placements associated with that segment.

If $N_{Other(AC)}$ (i.e., $N_{Other}$ for any campaign associated with a segment) does not equal zero or if the budget score for a campaign having $N_{Other(AC)}$ equal to zero (Budget_Score$_{(AC)}$) is greater than or equal to 1, the segment weight for that segment associated with a current campaign (i.e., Segment Weight$_{(CC)}$) can be calculated similar to calculating the segment weights using formula (2).

While shown and described above as normalizing raw weights with respect to the segments in a single campaign, in other embodiments, the raw weights can be normalized using any other suitable method. For example, in some embodiments, the raw weights for the segments can be normalized with respect to the sum of the raw weights for that segment across multiple campaigns. More specifically, as discussed above, Segment 1 can be applicable to any number of campaigns. For example, if Segment 1 (FIG. 3) is associated with two campaigns (Campaign 1 and Campaign 2), the raw weights of Segment 1 with respect to the two campaigns can be normalized. For example, if the raw weight of Segment 1, Campaign 1 is 2.5 (calculated above with respect to formulas (2) and (3)) and the raw weight of Segment 1, Campaign 2 is 5, the normalized weight for Segment 1, Campaign 1 is 0.333 (2.5/(2.5+5)). Similarly, the normalized weight for Segment 1, Campaign 2 is 0.666 (5/2.5+5)). Accordingly, as discussed in further detail herein, because Segment 1, Campaign 2 has a greater weight than Segment 1, Campaign 1, a greater number of advertisements from Campaign 2 will be placed at the placements of Segment 1 than advertisements from Campaign 1. Thus, the normalized weights ensure that a specific segment (e.g., Segment 1) is used efficiently among the different campaigns (e.g., Campaign 1 and Campaign 2). More specifically, the normalized weights ensure that advertisements placed at the placements of a segment are from campaigns with higher weights for that segment.

Figure 5:
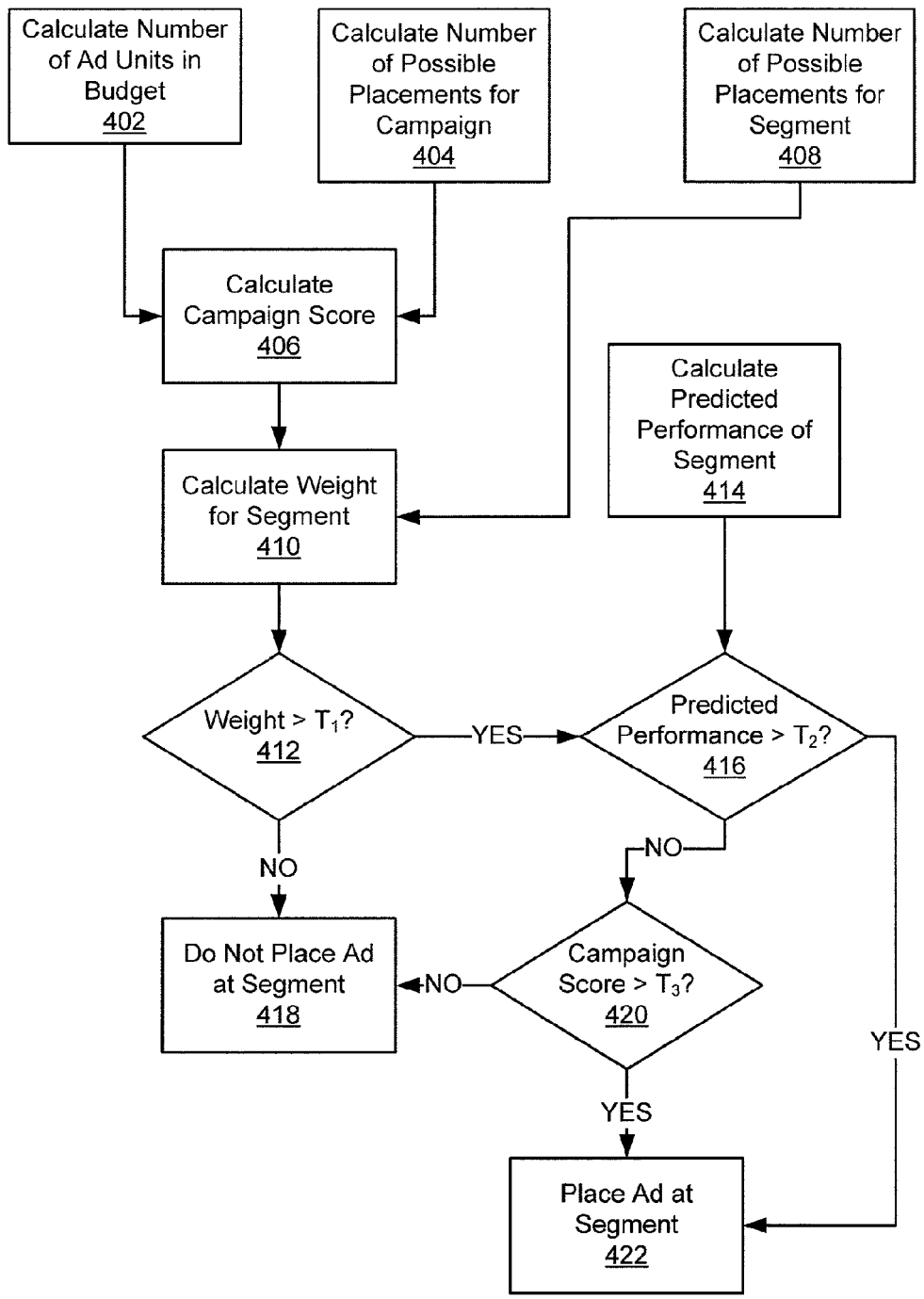
FIG. 5 is a flow chart illustrating a method of optimizing the allocation of advertisements, according to another embodiment.

FIG. 5 is a flow chart illustrating a method 400 of optimizing the allocation of advertisements. In some embodiments, the method 400 can be performed by a processor (e.g., processor 122 or 200) at a host device (e.g., host device 120). As such, the processor can provide, using the method 400, an indication as to what advertisements to present, place and/or serve with respect to an advertisement campaign.

The method 400 includes calculating a number of advertisement units in a budget, at 402. As described above, in some embodiments advertisement units included within the campaign budget can be a number of impressions, a number of advertisement clicks, a conversion rate, a time spent, an engagement rate, a specified reach, a specified frequency, a specified brand-lift measurement, and/or the like. Accordingly, a total budget amount can be divided by a cost per advertisement unit to determine the number of advertisement units in the budget.

A number of possible placements for a campaign is calculated, at 404. In some embodiments and as described above, the number of possible placements for a campaign can be calculated by a placement estimator module (e.g., placement estimator module 204, shown and described with respect to FIG. 2). In some embodiments, a campaign can be targeted toward a specific demographic and/or criterion (e.g., age, sex, geographic location, income level, indicated preferences, websites visited, IP address, education level, school attended, website subscriptions, profession, interests, hobbies, time of the day, day of the week, month, season of year, and/or the like). The number of possible placements for a campaign is the number of possible places (e.g., websites, audio streams, video streams, etc.) to present an advertisement according to the targeted demographic and/or criterion. Similarly stated, the number of possible placements for a campaign is the amount of placement inventory for the specified criterion of a campaign.

A campaign score is calculated, at 406. The campaign score is calculated based on the number of advertisement units in a budget and the number of possible placements for a campaign. In some embodiments, the campaign score can be a relationship (e.g., a ratio) between the number of advertisement units in the budget and the number of possible placements for the campaign. Thus, the campaign score can provide an indication of the number of advertisement units for the budget with respect to the number of possible placements at which the advertisement units can be obtained (e.g., clicks, impressions, etc.). In some embodiments, and as described above, such a calculation can be performed by a budget module (e.g., budget module 202, shown and described with respect to FIG. 2).

A number of possible placements for each segment associated with the campaign can be calculated, at 408. The criterion of a segment of a campaign can be a subset of the criterion of the campaign. For example, if the campaign is directed toward individuals with an income of greater than $100,000, a segment of that campaign could be females between 35-45 living in the pacific time zone with an income of greater than $100,000. A criterion for a segment can have any number of properties, parameters, and/or requirements. The number of possible placements for a segment of a campaign is the number of possible places (e.g., websites, audio streams, video streams, etc.) to present an advertisement to the demographic and/or criterion associated with that segment. Similarly stated, the number of possible placements for a segment of a campaign is the amount of placement inventory for the specified criterion of a segment. In some embodiments, the number of possible placements for each segment associated with a campaign can be calculated by a placement estimator module (e.g., placement estimator module 204, shown and described with respect to FIG. 2).

A weight is calculated for each segment associated with the campaign, at 410. The weight for a segment is calculated based on the campaign score, the number of possible placements for the campaign, and the number of possible placements for that segment. In some embodiments, a weight module (e.g., weight module 206 shown and described with respect to FIG. 2) can calculate the weight of each segment of the campaign. In some embodiments, the weight of a segment is based at least partially on a relationship (e.g., ratio) between the number of possible placements for that segment of the campaign and the number of possible placements for the remaining segments of the campaign. In other embodiments, the weight can be based at least partially on a relationship between the number of possible placements for that segment of the campaign and the number of possible placements for the entire campaign. In still other embodiments, any other relationship between the campaign score, the number of possible placements for the campaign, and the number of possible placements for the segment can be used to calculate the weight.

The weight of each segment is compared to a first threshold $T_1$, at 412. In some embodiments, the first threshold $T_1$ can be a random threshold, a predetermined threshold, an average of the weights of the segments of a campaign, and/or the like. If the weight of a segment is less than the first threshold $T_1$, advertisements associated with the campaign are not placed at the segment, at 418. A weight less than the threshold indicates that that segment of the campaign does not include enough placements to make placing advertisements associated with the campaign efficient with respect to spending the budget of the campaign.

If the weight of a segment is greater than the first threshold $T_1$, a performance score of advertisements placed at that segment is compared to a second threshold $T_2$, at 416. Prior to comparing the performance score with the second threshold $T_2$, the performance score of each segment associated with the campaign is calculated, at 414. In some embodiments, the performance score of each segment can be calculated at a performance module (e.g., performance module 208 shown and described with respect to FIG. 2). In some embodiments, the performance score of a segment can be based at least in part on a relationship (e.g., a ratio) between a success metric of advertisements from a campaign placed at that segment and the number of impressions associated with the campaign for that segment.

If the performance score is greater than the second threshold $T_2$, an advertisement associated with the campaign can be placed at the segment, at 422. In some embodiments, prior to placing advertisements at the segment, each segment with a weight greater than the first threshold $T_1$ and a performance score greater than the second threshold $T_2$ is ordered based on performance score. Advertisements are first placed at the placements associated with the segments having the highest performance score. Advertisements are then placed at the placements associated with the other segments until the campaign budget is spent. Accordingly, the advertisements are placed at the placements of the segments having the highest performance scores prior to being placed at the placements of the segments having lower performance scores.

In some embodiments, if the performance score is less than the second threshold $T_2$, the campaign score is compared with a third threshold $T_3$, at 420. The third threshold $T_3$ can act as a gate to allow advertisements to be placed at placements associated with a segment having a performance score less than the threshold. The third threshold $T_3$ can be associated with a time left to spend the budget. For example, the third threshold $T_3$ can be based on a number of seconds left in a time to spend the budget. If the budget score is greater than the third threshold $T_3$, there is a large number advertisement units remaining in the budget and/or a small number of possible placements for the advertisements of a campaign without much time left to spend the budget. Accordingly, advertisements are placed at placements of segments having a performance score of less than the second threshold $T_2$, at 422, in order to spend the budget prior to the time to spend the budget elapsing.

In other embodiments, any number of thresholds can be used. In some embodiments, for example, only one of the thresholds ($T_1$, $T_2$, $T_3$) is used. In other embodiments, for example, two of the three thresholds ($T_1$, $T_2$, $T_3$) are used. In yet other embodiments, additional thresholds can be used.

Figure 6:
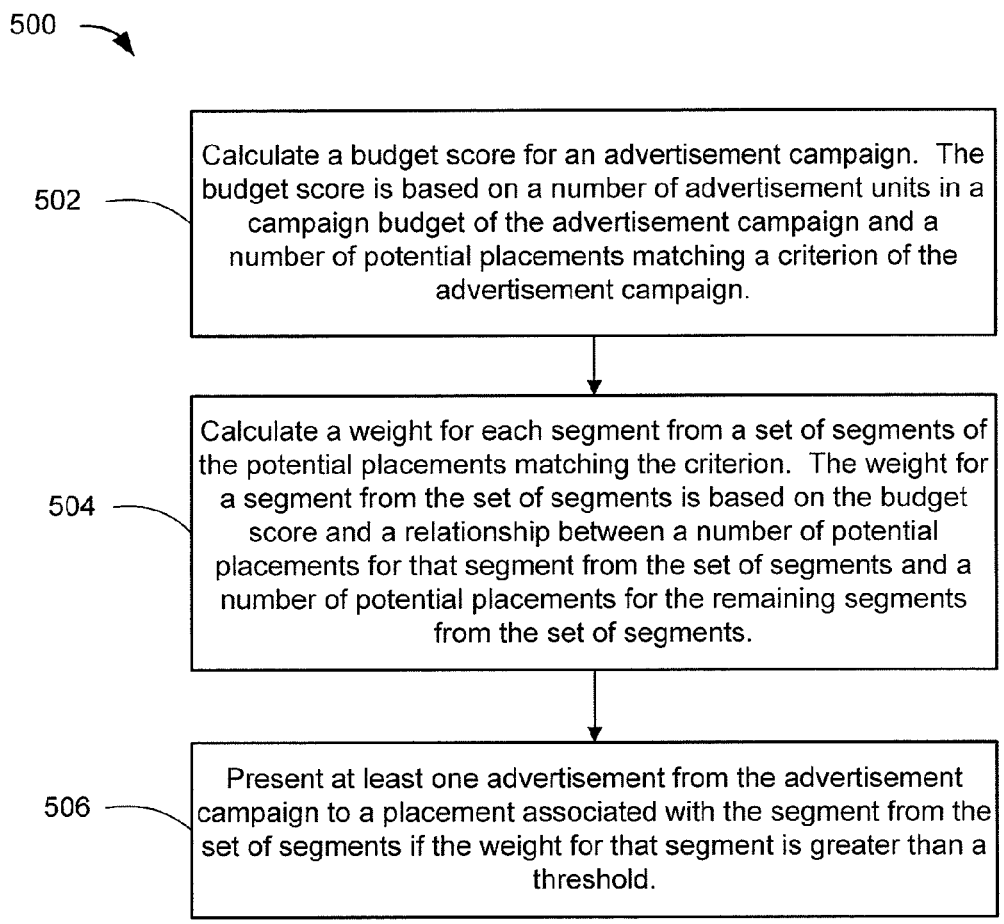
FIG. 6 is a flow chart illustrating another method of optimizing the allocation of advertisements, according to another embodiment.

While shown and described above as using both a performance score for a segment and a weight for a segment to determine whether or not to place advertisements at placements associated with that segment, in other embodiments, only one of the performance scores for the segment or the weight for the segment is used to determine whether or not to place advertisements at placements associated with the segment. FIG. 6, for example, is a flow chart illustrating another method 500 of optimizing the allocation of advertisements, according to another embodiment. The method 500 uses the weight of the segments of an advertisement campaign to optimize the placement of advertisements.

The method 500 includes calculating a budget score for an advertisement campaign, at 502. The budget score is based on a number of advertisement units in a campaign budget of the advertisement campaign and a number of potential placements matching a criterion of the advertisement campaign. In some embodiments, the budget score can be calculated similar to the budget score calculated using the budget module 202, shown and described with respect to FIG. 2.

A weight is calculated for each segment from a set of segments of the potential placements matching the criterion, at 504. The weight for a segment from the set of segments is based on the budget score and a relationship between a number of potential placements for that segment from the set of segments and a number of potential placements for the remaining segments from the set of segments. In some embodiments, such a relationship can be a ratio between the number of potential placements for that segment and the number of potential placements for the remaining segments. In other embodiments, the weight for a segment from the set of segments can be based on the budget score and a relationship between the number of potential placements for that segment and the number of potential placements matching the criterion of the advertisement campaign.

At least one advertisement from the advertisement campaign is presented to a placement associated with the segment from the set of segments if the weight for that segment is greater than a threshold, at 506. Accordingly, the weight of each segment from the set of segments is used to optimize the placement of advertisements. Because a budget score is used in the calculation of the weight of each segment, the campaign budget will be factored into whether or not an advertisement is placed at a placement of the segment.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as separately comparing the weight of a segment to a first threshold and the performance score of the segment to a second threshold, in other embodiments, a relationship between the weight of the segment and the performance score of the segment can be defined and/or calculated and compared to a single threshold. For example, the weight and performance can be summed, averaged, and/or combined using any suitable method. After the weight and performance score for the segment are combined into a single metric, the metric can be compared to a threshold to determine whether to place an advertisement at a placement associated with that segment.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to cause a processor to:
    calculate a budget score for an advertisement campaign, the budget score being based on a number of advertisement units in a campaign budget of the advertisement campaign and a number of potential placements matching a criterion of the advertisement campaign;
    calculate a weight for each segment from a plurality of segments of the potential placements matching the criterion, the weight for a segment from the plurality of segments being based on the budget score and a relationship between a number of potential placements for that segment from the plurality of segments and a number of potential placements for the remaining segments from the plurality of segments; and
    present at least one advertisement from the advertisement campaign to a placement associated with the segment from the plurality of segments if the weight for that segment is greater than a threshold.

2. The non-transitory processor-readable medium of claim 1, wherein the threshold is a first threshold, the code representing instructions to cause the processor to present advertisements includes code representing instructions to cause the processor to present advertisements from the advertisement campaign to the placement associated with the segment from the plurality of segments if the weight for that segment is greater than the first threshold and a predicted performance of the advertisement campaign for that segment is greater than a second threshold.

3. The non-transitory processor-readable medium of claim 1, further comprising code representing instructions to cause the processor to:
    generate a random value for the threshold.

4. The non-transitory processor-readable medium of claim 1, wherein the relationship is a ratio of the number of potential placements for the segment from the plurality of segments to the number of potential placements for the remaining segments from the plurality of segments.

5. The non-transitory processor-readable medium of claim 1, further comprising code representing instructions to cause the processor to:
    calculate a predicted performance value for the segment from the plurality of segments based on a relationship of a success metric for the segment from the plurality of segments and a number of impressions for the segment from the plurality of segments.

6. The non-transitory processor-readable medium of claim 1, wherein the budget score for the advertisement campaign increases as the number of advertisement units in the advertisement budget of the advertisement campaign increases or the number of potential placements matching the criterion of the advertisement campaign decreases.

7. The non-transitory processor-readable medium of claim 1, wherein the code representing instructions to cause the processor to present advertisements includes code representing instructions to cause the processor to present advertisements to a greater number of segments from the plurality of segments as the budget score for the advertisement campaign increases.

8. The non-transitory processor-readable medium of claim 1, wherein the advertisement units include one of advertisement impressions, advertisement clicks, conversion rate, time spent, engagement rate, reach frequency, or brand-lift.

9. An apparatus, comprising:
a memory storing a weight module configured to calculate a weight for each segment from a plurality of segments of potential advertisement placements matching a criterion, the weight for a segment from the plurality of segments being based at least partially on (1) a budget score for an advertisement campaign with at least one advertisement and (2) a number of potential placements for the segment from the plurality of segments,
the memory storing a performance module configured to calculate a performance score for the advertisement campaign at each segment from the plurality of segments, the performance score of the segment from the plurality of segments being based on a success metric for the at least one advertisement at the segment from the plurality of segments and a number of impressions for the segment from the plurality of segments,
the memory storing an allocator module configured to present the at least one advertisement at a placement associated with the segment from the plurality of segments if the weight for the segment is greater than a first threshold and the performance score for the segment is greater than a second threshold.

10. The apparatus of claim 9, wherein:
the memory stores a budget module configured to calculate the budget score for the advertisement campaign, the budget score being based on a number of advertisement units in a campaign budget of the advertisement campaign and a number of potential advertisement placements matching the criterion of the advertisement campaign.

11. The apparatus of claim 9, wherein:
the memory stores a placement estimator module configured to predict a number of potential placements for each segment from the plurality of segments.

12. The apparatus of claim 9, wherein the performance module is configured to assign a maximum performance score for the performance score of the segment from the plurality of segments prior to the at least one advertisement being placed at a placement associated with the segment from the plurality of segments.

13. The apparatus of claim 9, wherein the allocator module is configured to generate a random value for the first threshold.

14. The apparatus of claim 9, wherein the weight for the segment from the plurality of segments is partially based on a ratio of the number of potential placements for the segment from the plurality of segments to a number of potential placements for the remaining segments from the plurality of segments.

15. A non-transitory processor-readable medium storing code representing instructions to cause a processor to:
calculate a weight for each segment from a plurality of segments of potential advertisement placements matching a criterion, the weight for a segment from the plurality of segments being based at least partially on a campaign budget of an advertisement campaign and a number of potential placements for the segment from the plurality of segments;
calculate a predicted performance value for the segment from the plurality of segments based on a relationship of a success metric for the segment from the plurality of segments and a number of impressions for the segment from the plurality of segments; and
determine whether to present an advertisement from the advertisement campaign at a placement associated with the segment from the plurality of segments based on the weight for the segment and the predicted performance value for the segment.

16. The non-transitory processor-readable medium of claim 15, wherein the code representing instructions to cause the processor to determine whether to present the advertisement from the advertisement campaign includes code representing instructions to cause the processor to present the advertisement from the advertisement campaign at the placement associated with the segment from the plurality of segments when the weight for the segment is greater than a first threshold and the predicted performance value for the segment is greater than a second threshold.

17. The non-transitory processor-readable medium of claim 15, wherein the weight for the segment from the plurality of segments is based at least partially on a ratio of the number of potential placements for the segment from the plurality of segments to a number of potential placements for the remaining segments from the plurality of segments.

18. The non-transitory processor-readable medium of claim 15, wherein the success metric for the segment from the plurality of segments includes a number of clicks for an advertisement from the advertisement campaign displayed at a placement associated with the segment from the plurality of segments.

19. The non-transitory processor-readable medium of claim 15, wherein the campaign budget of the advertisement campaign provides for at least one of a number of advertisement impressions or a number of advertisement clicks.

20. The non-transitory processor-readable medium of claim 15, wherein the predicted performance value for the segment from the plurality of segments is a maximum predicted performance value prior to an advertisement from the advertisement campaign being placed at a placement associated with the segment from the plurality of segments.

* * * * *

UNITED STATES PATENT AND TRADEMARK OFFICE
CERTIFICATE OF CORRECTION

| | | |
|---|---|---|
| PATENT NO. | : 8,615,430 B2 | Page 1 of 1 |
| APPLICATION NO. | : 12/950160 | |
| DATED | : December 24, 2013 | |
| INVENTOR(S) | : Yonezaki et al. | |

It is certified that error appears in the above-identified patent and that said Letters Patent is hereby corrected as shown below:

In the Specification

Column 11, lines 18-19 – change "noinalized" to --normalized--

In the Claims

Claim 2, (lines 3-4) column 18, lines 23-24:

delete "advertisements"

Claim 2, (line 5) column 18, line 25:

change "advertisements" to --the at least one advertisement--

Claim 6, (lines 3-4) column 18, lines 50-51:

change "advertisement" to --campaign--

Claim 7, (line 3) column 18, lines 56:

delete "advertisements"

Claim 7, (lines 4-5) column 18, lines 57-58:

change "advertisements" to --the at least one advertisement--

Signed and Sealed this
Twenty-fourth Day of February, 2015

Michelle K. Lee
*Deputy Director of the United States Patent and Trademark Office*